Dec. 26, 1939.  R. G. JEWELL  2,184,347

TELEMETER TRANSMITTER

Filed Dec. 10, 1937

Inventor:
Richard G. Jewell,
by Harry E. Dunham
His Attorney.

Patented Dec. 26, 1939

2,184,347

UNITED STATES PATENT OFFICE 2,184,347

TELEMETER TRANSMITTER

Richard G. Jewell, Lynn, Mass., assignor to General Electric Company, a corporation of New York Application December 10, 1937, Serial No. 179,156

8 Claims. (Cl. 172—239)

My invention relates to telemetering systems and concerns particularly arrangements for electrically transmitting mechanical motions either of rotation or deflection.

It is an object of my invention to provide a telemeter transmitter for transmitting straight line indications or for converting straight line motion into circular motion electrically. Another object is to provide an arrangement for multiplying angular or circular motion electrically.

Other and further objects and advantages will become apparent as the description proceeds.

Telemetric systems in which a deflection or a rotation may be reproduced at a distance are applicable to the transmission of numerous types of measurements. In many of these systems straight line motion takes place in a mechanical indicator, the indications of which are to be transmitted. In such cases it is desirable to be able to transmit the indications directly over an electrical system without first converting the straight line motion into rotary motion mechanically.

In accordance with my invention in its preferred form, I provide at the transmitting end a special straight rheostat having two parallel portions and a linearly movable member carrying brushes at the ends through which direct current is suppleid to the two portions of the rheostat. At the receiving end, a toroidal winding is provided having a transversely magnetized coaxial rotor of high-coercive force magnetic material carrying an indicating pointer. Suitable points of the rheostat and the toroidal winding are connected by conductors extending between the transmitting and receiving stations.

Figure 1:
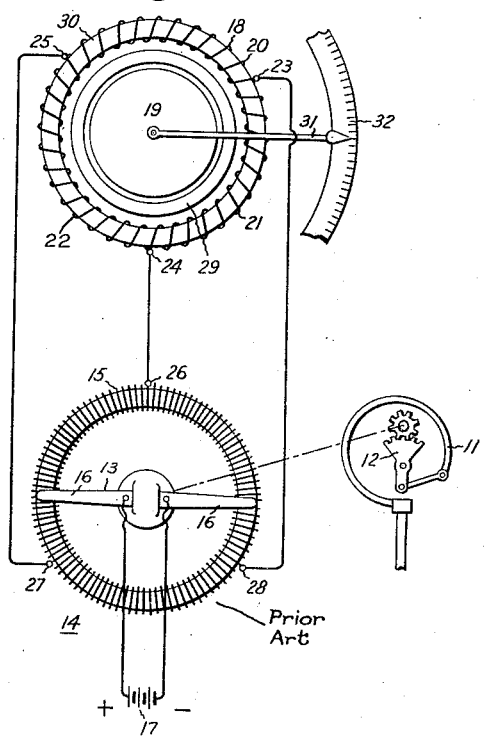
Figure 2:
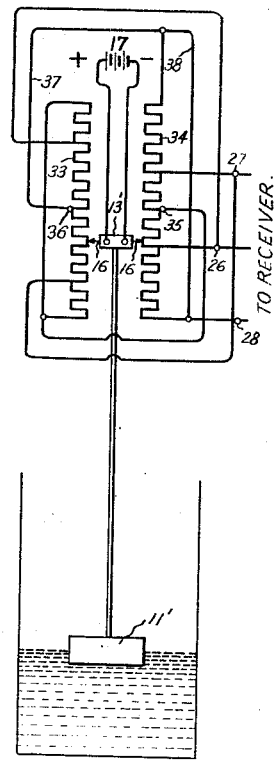
Figure 3:
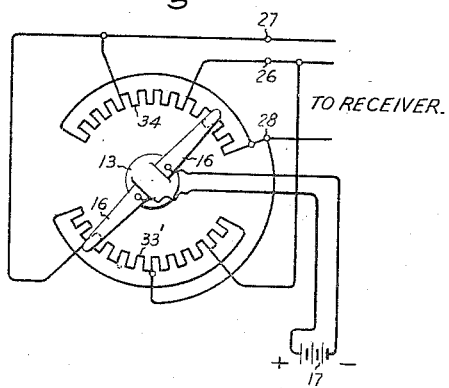

The invention will be understood more readily from the following detailed description when considered in connection with the accompanying drawing and those features of the invention which are believed to be novel and patentable will be pointed out in the claims appended hereto. In the drawing, Fig. 1 is a circuit diagram representing schematically, for the sake of illustration, an arrangement having a rotary transmitter which is not my invention; Fig. 2 represents one embodiment of my invention having a transmitting instrument for transmitting straight line indications or for use in converting straight line motion into circular motion; and Fig. 3 is a modification of the arrangement of Fig. 2 for transmitting angular indications having a maximum range of less than 360 degrees at the transmitting end or for use in converting fractional revolutions into complete revolutions.

Fig. 1 illustrates an arrangement with a rotary transmitter for the remote indication of pressure. A Bourdon tube pressure gage 11 has a movable element 12 connected to a movable arm 13 of a telemetric transmitting instrument 14. The instrument 14 includes an annular rheostat 15 which may conveniently be wound upon a toroid or upon an annulus. The movable arm 13 carries a pair of contact blades or brushes 16 which are insulated from each other and which contact at the ends with two diametrically opposite points in the rheostat 15. The arm 13 lies along a diameter of the rheostat 15 and is rotatable about the center thereof in response to deflection of the Bourdon tube gage 11. A suitable source of direct-current 17 is connected to the brushes or contacts 16.

At the receiving station, there is a receiving instrument or indicator comprising a winding 18 and a permanent magnet armature or rotor 19. The winding 18 is divided into not less than three coils 20, 21, and 22 which, in the arrangement of Fig. 1, are connected in series to form a toroidal winding with not less than three terminals or taps 23, 24, and 25 at equidistant points around the periphery of the toroidal winding 18. The terminals 23, 24, 25, are connected to corresponding terminals 28, 26, and 27, which are connected to points equidistant around the periphery of the annular rheostat 15.

The armature 19 is preferable substantially cylindrical in shape or has a substantially circular cross section conforming in shape to the inner surface of the winding 18 and is substantially coaxial therewith. The armature 19 is transversely magnetized and, for the sake of maximum torque and retention of strength, it is composed of a high coercive force magnetic material. In order to minimize vibration of the armature and provide adequate damping, a damping ring 29 of copper or other current-conducting material is interposed between the armature 19 and the winding 18. For the purpose of increasing both the deflection-producing torque and the damping, I may provide a core 30 for the winding 18 composed of a magnetic material having a high permeability and low hysteresis, for example, such as a nickel-iron alloy containing approximately 78½ per cent nickel.

The armature 19 may be composed of a high coercive force material such as cobalt steel or an alloy of iron and six to fifteen per cent aluminum and twenty to thirty per cent nickel, for example. If desired the stator winding of the receiver instrument may be similar to a stator winding of a standard polyphase alternating current dynamo electric machine, such as a generator or motor and in the description and claims I utilize the phrase "polyphase dynamo field winding" to refer generically to the various specific types of windings which may be utilized in the receiver stator to produce a field the direction of which may be controlled by the types of transmitters which I disclose.

The manner of operation of the apparatus will be apparent from the consideration of the fact that, as the arm 13 is rotated, the polarities and relative magnitudes of the voltage drops in the three sectors of the rheostat 15 will be varied. The voltages applied to the coils 20, 21, and 22 will produce fluxes in the core 30 which combine to produce a resultant magnetomotive force in a particular direction, depending upon the position of the movable arm 13. For example, in the position shown, the voltages applied to the coils 21 and 22 are equal and produce flux of the same polarity as does the voltage applied to the coil 20. The magnetomotive force produced in the receiver will accordingly be in a horizontal direction and the rotor 19 will assume the position in which its line of magnetization is also horizontal. As the arm 13 is rotated in a counterclockwise direction, the voltage applied to the coil 22 will increase whereas that applied to the coil 21 will decrease, causing the direction of the resultant flux in the receiver to rotate clockwise. Inasmuch as the connections of the transmitter and receiver are symmetrical with respect to a transverse line between them, it will be apparent that the angular positions of the arm 13 and the pointer 31 will also be symmetrical and the pointer 31 will rotate in a clockwise direction as the arm 13 rotates in a counterclockwise direction and vice versa.

In connection with the transmission of certain types of indications, such as the height of a float 11' in a liquid level indicator, it is more convenient to employ a transmitter arranged to have its contacts move in a straight line instead of utilizing a rack and pinion to convert the motion into rotation as would be required in the case of a rotary transmitter, such as the instrument 14 in Fig. 1. In order to obtain such straight line action, I may employ a transmitter of the type illustrated in Fig. 2 in which the resistor 15 of Fig. 1 is replaced by a special rheostat including two straight resistors 33 and 34 tapped at suitable points for connection to the terminals 26, 27 and 28 from which suitable conductors lead to corresponding receiver terminals 24, 25 and 23, as in the arrangement of Fig. 1. In the arrangement of Fig. 2, the ends of the resistor 33 are connected together and the ends of the resistor 34 are connected to the midpoint 36 of the resistor 33. Although not necessary, the ends of the resistor 33 may be connected to the midpoint 35 of the resistor 34. For a substantially uniform scale distribution, the arrangement of Fig. 2 has the terminal 28 connected at the lower end of the resistor 34, the terminal 26 connected one-third of the way up on resistor 34, and the terminal 27 connected two-thirds of the way up on the resistor 34. A tap one-sixth of the way up on resistor 33 is likewise connected to the terminal 27 and a tap five-sixths of the way up on resistor 33 is likewise connected to the terminal 26. It will be understood, however, that the location of the taps may be varied when it is desired to change the scale distribution.

The movable arm 13', in this case adapted for straight line up and down motion, carries contacts 16 connected to a source of direct current 17 and the contacts are adapted to slide along the resistors 33 and 34 corresponding to the action in Fig. 1. As the contacts 16 slide up and down the resistors 33 and 34, the polarities of the voltage applied between the terminals 26, 27 and 28 will vary in a manner somewhat analogous to that explained in connection with Fig. 1.

If it is assumed that the sliding arm 13' is initially at the lowermost position and the contacts 16 at the lower ends of the resistors 33 and 34, the potential of the terminal 28 will have its maximum negative value since the right-hand one of the contactors 16 is connected to the negative terminal of the source 17. As the sliding arm moves towards the half-way position, the potential of the terminal 28 becomes less negative and more positive until the arm 13' reaches the half-way position in which the contacts 16 are at the mid taps 36 and 35. In this position, the left-hand or positive terminal of the source 17 is connected through the conductors 37 and 38 to the terminal 28, the potential of which accordingly has its maximum postive value. Then, as the arm 13' moves toward the top, the terminal 28 becomes less positive and more negative until, with the arm 13' in the uppermost position, the terminal 28 is again at the maximum negative potential since the right-hand or negative terminal of the source 17 is now connected through the conductor 38 directly to the terminal 28. The potential of the terminal 28 has thus completed a cycle similar to that of a sine wave.

The terminals 26 and 27, which are at the one-third and two-thirds points from the lower end of the resistor 34, each go through a cycle of variations of potential similar to that of the terminal 28 except that the phase relationships are different. The terminals 26 and 27 reach the minimum negative potential at times when the contactor is respectively one-third and two-thirds of the way toward the upper end of the resistor 34. Inasmuch as the terminal 28 goes through a complete voltage cycle when the contactor moves from the lower end to the upper end of the resistor 34, this movement corresponds to 360° electrical degrees. The terminal 26 also goes through a complete voltage cycle but reaches the maximum negative potential one-third of the distance later and this, therefore, corresponds to 120 electrical degrees later. Similarly, terminal 27 goes through a cycle of potential variations and reaches the same values 240 degrees later than the terminal 28. The three terminals 28, 26, and 27, therefore, behave like a three-phase system and, when connected to the receiver or indicator of Fig. 1, produce rotation of the armature 19. It is thus apparent that the motion of the arm 13' the full length of the resistors 33 and 34 is converted into a complete rotation of the pointer 31 (Fig. 1).

If one of the resistors of Fig. 2, for example, the resistor 33, is turned end for end and the two resistors are bent into arcs, as illustrated in Fig. 3, the arrangement may be employed for converting a rotation of the arm 13 through an angle less than 360 degrees into rotation of the pointer 31 through a full 360 degrees. In the specific arrangement shown, the resistors 33' and 34 occupy arcs somewhat less than 180 degrees in length and, accordingly, a given angular rotation of the arm 13 causes the pointer 31 to rotate through slightly more than double such angle.

It will be seen from observation of Figures 2 and 3 that each of the resistors 33 and 34 or 33' and 34 is divided into a number of equal portions equal to the number of terminals 26, 27 and 28; that the terminals are connected to spaced points on the resistors; that for substantially uniform scale distribution, the spacing of these points is substantially uniform; and that corresponding points on the two resistors are displaced approximately one-half the length of a resistor. For example, in Figure 2, the terminal 28 is connected at the end of the resistor 34, but one-half the way from the end of the resistor 33. Similarly, terminal 26 is connected to a point one-third the way from the end of the resistor 34, but to a point five-sixths of the way from the end of the resistor 33, just one-half more than one-third. Since there are three terminals, the resistor 34 is divided into three portions by such terminals and similarly, the resistor 33 is divided into three portions. One of such portions of the resistor 33 is split between the ends of the resistor which are connected together, however, so as to form a continuous portion of the resistor electrically.

In accordance with the provisions of the patent statutes, I have described the principle of operation of my invention together with the apparatus which I now consider to represent the best embodiment thereof but I desire to have it understood that the apparatus shown is only illustrative, and that the invention may be carried out by other means.

What I claim as new and desire to secure by Letters Patent of the United States, is:

1. A transmitter for a rectilinear motion direct current telemeter comprising a pair of parallel resistors, a movable member carrying a pair of contacts one of which is adapted to slide along one of said resistors and the other of which is adapted to slide along the other of said resistors, a source of direct current connected between said contacts, means for moving said member in accordance with an indication to be transmitted, connections between the ends of one of said resistors and the middle of the second, connections between the ends of the second resistor, three terminals for connection to current conducting lines leading to a receiver, connections from one of said terminals to a point intermediate the middle and an end of said first resistor, and to a point near one end of said second resistor, connections from the second of said terminals to a point intermediate the middle and other end of the first resistor and to a point near the other end of said second resistor, and connections from the third of said terminals to the ends of the first of said resistors.

2. A telemeter transmitter comprising a resistor in arcuate shape and a second resistor in arcuate shape, a movable arm carrying a pair of contacts one of which is adapted to slide along the first of said resistors and the other of which is adapted to slide along the second of said resistors, a source of direct current connected between said contacts, means for moving said arm in accordance with an indication to be transmitted, three terminals for connection to lines leading to a telemeter receiver, connections from the first of said terminals to the ends of the first of said resistors and to the middle of the second resistor, connections from the second of said terminals to a point intermediate one end and the middle of the first resistor, and to a point relatively near one end of the second resistor, connections from the third of said terminals to a point intermediate the other end and the middle of the first of said resistors and to a point relatively near the other end of the second of said resistors, and connections between the ends of the second resistor.

3. An arrangement for multiplying angular motion comprising a transmitter and a receiver with three current conducting lines connecting the transmitter to the receiver, said transmitter comprising a first resistor in arcuate shape and a second resistor in arcuate shape, a movable arm carrying a pair of contacts one of which is adapted to slide along the first of said resistors and the other of which is adapted to slide along the second of said resistors, a source of direct current connected between said contacts, means for moving said arm in accordance with angular motion to be multiplied, three terminals for connection to said current conducting lines, connections from the first of said terminals to the ends of the first of said resistors and to the middle of the second resistor, connections from the second of said terminals to a point intermediate one end and the middle of the first resistor, and to a point relatively near one end of the second resistor, connections from the third of said terminals to a point intermediate the other end and the middle of the first of said resistors and to a point relatively near the other end of the second of said resistors, and connections between the ends of the second resistor, said receiver comprising a polyphase dynamo field winding with terminals connected to said lines and a transversely magnetized rotatable armature in inductive relationship to said winding.

4. A transmitter for a rectilinear motion direct current telemeter comprising a first resistor, a second resistor placed parallel to the first resistor, a movable member carrying a pair of contacts one of which is adapted to slide along one of said resistors and the other of which is adapted to slide along the other of said resistors, a source of direct current connected between said contacts, means for moving said member in accordance with an indication to be transmitted, three terminals for connection to lines leading to a telemeter receiver, connections from the first of said terminals to the ends of the first resistor and the middle of the second resistor, connections from the second of said terminals to a point one-third the distance from the end of the first resistor, and to a point five-sixths the distance from the end of the second resistor, connections from the third of said terminals to a point two-thirds the distance from the end of the first of said resistors and to a point one-sixth the distance from the end of the second resistor, and connections between the ends of the second resistor.

5. A telemeter transmitter comprising a pair of arcuately shaped resistors, a rotatable arm carrying contacts one of which is adapted to slide along the first resistor and the other of which is adapted to slide along the second resistor, means for rotating said arm in accordance with variations in indications to be transmitted, three terminals for connection to lines leading to a telemeter receiver, a source of direct current connected between the contacts on said arm, connections from the first of said terminals to the ends of the first resistor and the middle of the second resistor, connections from the second of said terminals to a point one-third the distance from the end of the first resistor and to a point five-sixths the distance from the end of the second resistor, connections from the third of said terminals with a point two-thirds the distance from the end of the first resistor and to a point one-sixth the distance from the end of the second resistor, and connections between the ends of the second resistor.

6. A telemeter transmitter comprising a pair of resistors, a pair of contacts, a source of direct current connected between said contacts, means for simultaneously sliding one contact along one of said resistors and the other of said contacts along the other of said resistors in response to variations in indications to be transmitted, three terminals for connection of lines leading to a receiver, connections from the first terminal to the ends of the first resistor and the middle of said second resistor, connections from the second terminal to a point intermediate the near end and the middle of the first resistor and to a point relatively near the far end of the second resistor, connections from the third terminal to a point intermediate the middle and far end of the first resistor and to a point relatively near the near end of the second resistor, and connections between the ends of the second resistor.

7. An arrangement for converting linear motion and angular motion of less than 360 degrees to angular motion as great as 360 degrees, comprising a transmitter and a receiver with three lines connected between them, said transmitter comprising a pair of resistors, a pair of contacts, a source of direct current connected between said contacts, means for simultaneously sliding one contact along one of said resistors and the other of said contacts along the other of said resistors in response to motion to be converted, three terminals connected to said lines, connections from the first terminal to the ends of the first resistor and the middle of said resistor, connections from the second terminal to a point intermediate the near end and the middle of the first resistor and to a point relatively near the far end of the second resistor, connections from the third terminal to a point intermediate the middle and far end of the first resistor to a point relatively near the near end of the second resistor, and connections between the ends of the second resistor, said receiver comprising a polyphase dynamo field winding and a transversely magnetized armature in inductive relation to said field winding.

8. A telemeter transmitter comprising a pair of resistors, a pair of contacts, a source of direct current connected between said contacts, means for simultaneously sliding one contact along one of said resistors and the other of said contacts along the other of said resistors in response to variations in indications to be transmitted, a plurality of terminals for connection of lines leading to a receiver, connections from said terminals to spaced points on said resistors, the points on said resistors connected to the same terminal being displaced substantially one-half a resistor length each resistor having its ends connected together.

RICHARD G. JEWELL.